UNITED STATES PATENT OFFICE.

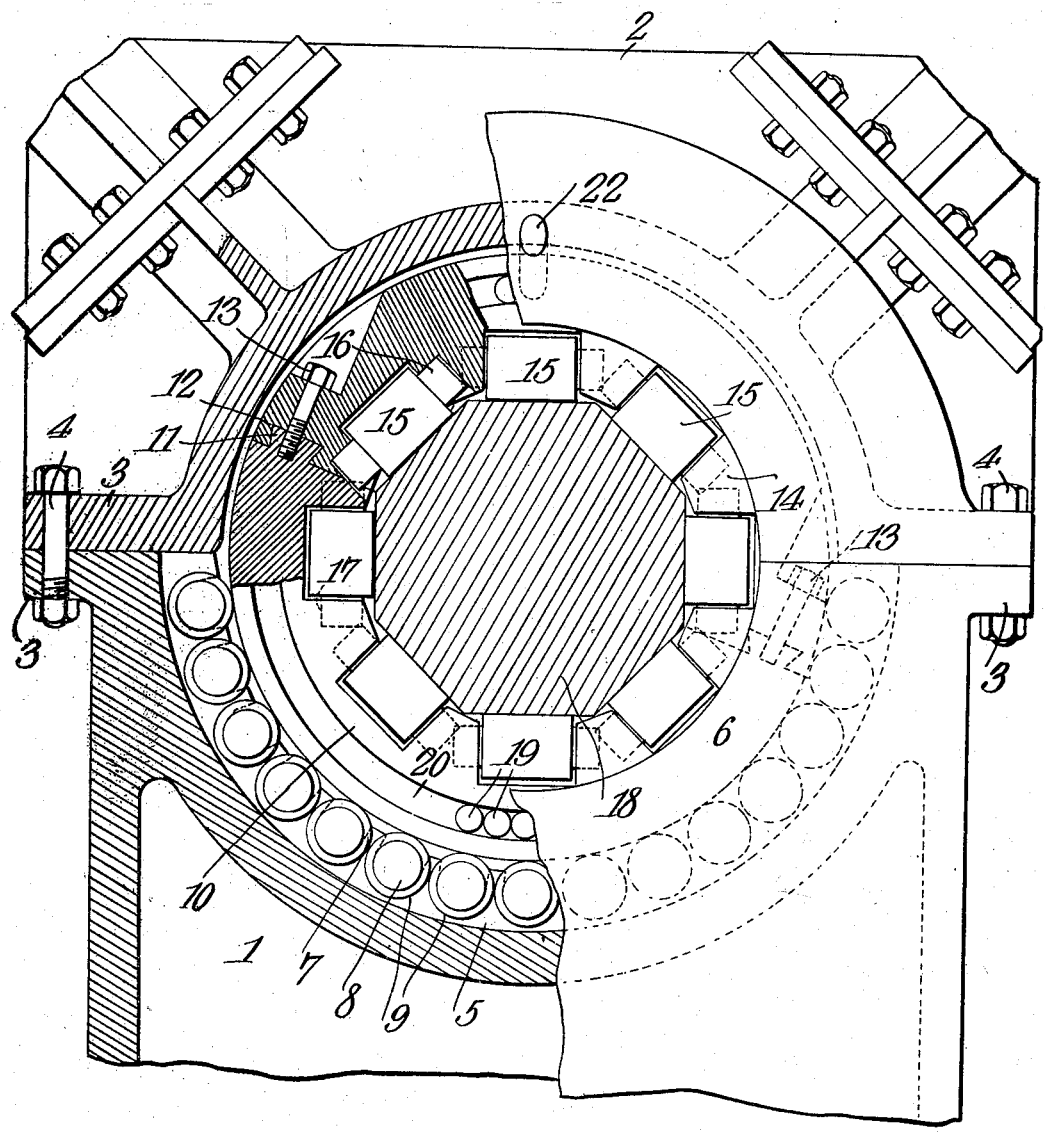

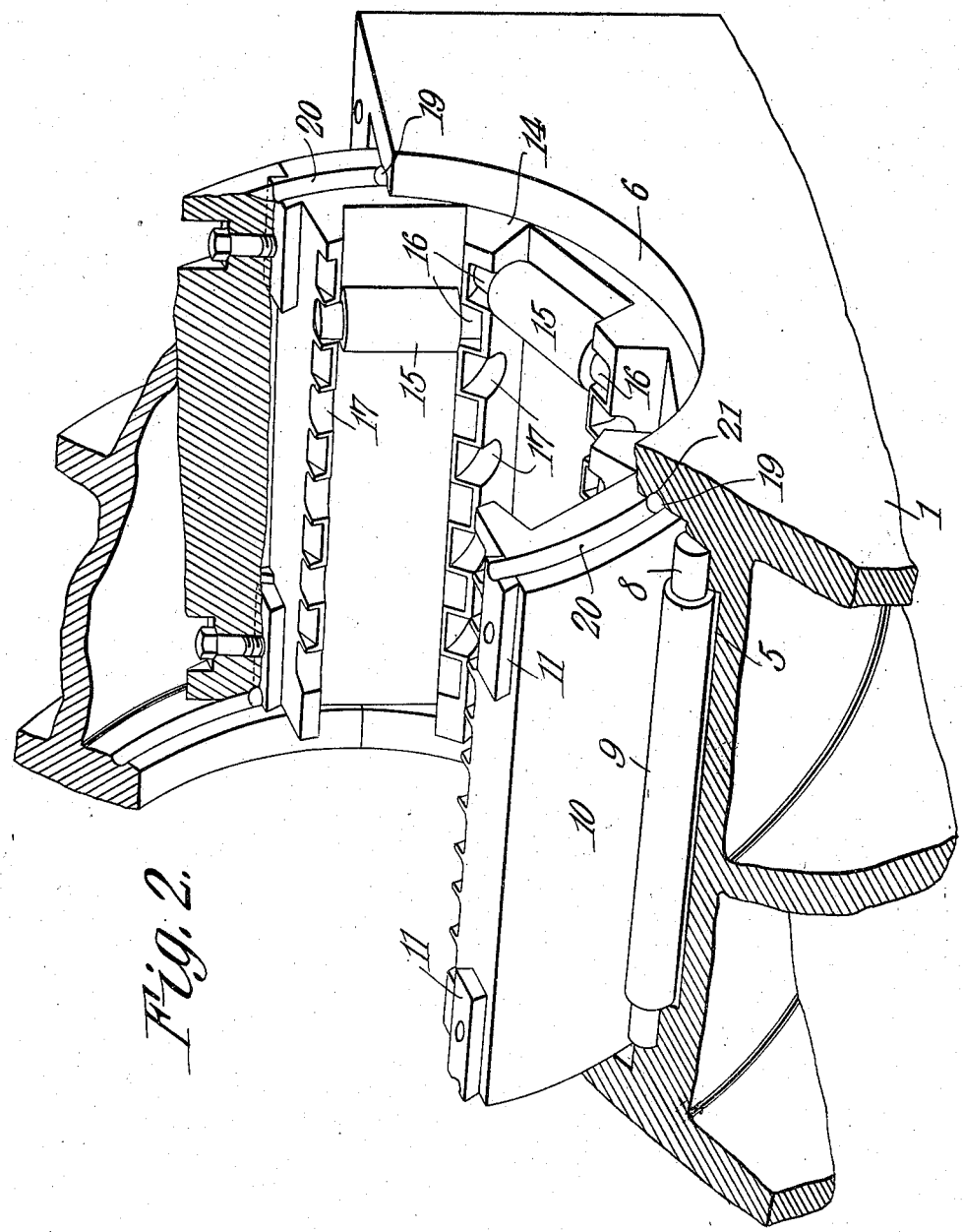

JOHN PRUE KARNS, OF BOULDER, COLORADO, ASSIGNOR TO THE J. P. KARNS TUNNELING MACHINE CO., OF BOULDER, COLORADO.

SHAFT-BEARING.

No. 867,511.  Specification of Letters Patent.  Patented Oct. 1, 1907.

Application filed February 23, 1907. Serial No. 358,901.

*To all whom it may concern:*

Be it known that I, JOHN PRUE KARNS, a citizen of the United States, residing at Boulder, in the county of Boulder and State of Colorado, have invented a new and useful Shaft-Bearing, of which the following is a specification.

This invention has reference to improvements in shaft bearings of the anti-friction roller type, and its object is to provide a shaft bearing intended more particularly for heavy shafts carrying large weights wherein the shaft moves both rotatably and longitudinally.

To this end, the invention comprises a collar for the shaft split into two halves which are coupled together in such manner as to bring no special strain upon the fastening devices, and within this collar are carried a number of longitudinal series of rollers so located and spaced that their journal supports are staggered in order that the rollers themselves may occupy practically all the interior surface of the collar, and these rollers are so disposed as to provide a polygonal bore for the collar through which the shaft may move longitudinally with the greatest freedom, but at the same time the shaft and collar cannot turn independently, and when the shaft is rotated the collar is carried with it.

The collar is seated upon a series of rollers placed parallel with the longitudinal axis of the collar and forming the lower half of a journal bearing for said collar, which latter is confined to its seat upon the longitudinal rollers by a cap-plate which, however, is or may be unprovided with roller contacts and, in fact, may be out of contact with the collar.

Since the roller bearing structure is designed for use with shafts having longitudinal as well as rotary movement, the collar is further provided with end-thrust ball-bearings.

The invention will be fully understood from the following detailed description taken in connection with the accompanying drawings forming part of this specification, in which,—

Figure 1 is an end elevation, partly in section, of the improved anti-friction roller bearings; and Fig. 2 is a perspective view, partly broken away, of the same.

Referring to the drawings, there is shown a journal casing comprising the lower or bed section 1 and the upper or cap section 2 having flanges 3 at their meeting edges for the passage of securing bolts 4 in the usual manner. The bed-plate 1 is formed with a semi-cylindrical seat 5 at each end of which are radially-disposed semi-circular flanges 6. Adjacent to the inner wall of each flange 6, the semi-cylindrical seat 5 is formed with a semi-circular series of pockets 7 shaped to constitute journal bearings for the journals 8 of rollers 9 which are longitudinally disposed in the seat 5 of the bed section 1 of the journal support. There are as many of these rollers arranged within the bed section 1 of the journal support as their diameter will permit, and they are properly located to constitute a substantially semicircular journal bearing for a collar 10. The exterior of this collar is a true cylinder and the collar is split through the diameter so as to constitute two equal parts, so that the collar may be readily applied to the shaft. To secure these two parts together the meeting faces of one part are provided with dovetailed tenons 11 near each end and corresponding dovetailed mortises 12 are formed throughout the length of the meeting faces of the other part so that this last-named part may be slid longitudinally on to the first-named part and the two parts will be held against lateral displacement relatively one to the other by the engagement of the dovetailed tenons 11 in the dovetailed mortises 12. It will be observed that the tenons 11 are comparatively short and located at the ends only of the cylinder section upon which they are formed, but, if desired, these tenons may be extended throughout the length of the collar 10. To prevent longitudinal displacement of the two parts of the collar 10, they may be further secured together by screws 13 having their heads countersunk into the mortised section of the collar and having their threaded ends engaging nuts formed in the tenons 11.

The inner face of the collar is shown polygonal in cross section and in the particular form shown in the drawings it is octagonal in cross section. At the angles formed by the meeting facets of the inner face of the collar are longitudinal ribs 14, those opposite the meeting faces of the two sections of the collar being split coincident with these said meeting faces, in the form shown in the drawing, but it is quite evident that the meeting faces of the two parts of the collar may be located at some point between certain of the ribs 14 if so desired. These ribs 14 are segmental in cross section so that the matching faces of two ribs are parallel one with the other, thereby forming pockets for the body portions of the rollers 15, the journals 16 of which are seated in substantially semi-cylindrical pockets 17 formed in the matching faces of contiguous ribs 14.

The diameter of the rollers 15 and the diameter of their journals 16 is so related that the rollers 15 may be placed parallel with their surfaces nearly touching and arranged parallel to the plane of rotation of the collar 10 and at right angles to the longitudinal axis of said collar. The journals 16 and their pockets 17, constituting journal bearings for the journals 16, are of such size that the pockets 17 on one side of a rib 14 can be located intermediate of the pockets 17 on the other side of a rib 14. By this arrangement each series of rollers 15 is staggered with relation to the next adjacent series of rollers 15 and the greatest possible support is provided by the rollers within the limits of the interior of the collar 10. The series of rollers 15 continue all around the interior of the collar 10 and serve as anti-friction roller bearings for a shaft 18 which, in the particular instance illustrated in the drawings, is octagonal in cross section where it passes through the collar 10. As will of course be evident, the non-circular form of the shaft will cause the latter when rotated to carry the collar with it about its axis of rotation. Therefore, all the series of rollers 15 will be from time to time brought into play to support the weight of this shaft and the parts carried thereby, and it may here be observed that in the particular structure shown in the drawing the shaft is supported by not less than three longitudinal series of rollers and part of the time by four longitudinal series of rollers. Thus this structure is particularly adapted for heavy shafts carrying great weights since not only is it supported by several series of rollers but the bearing surface of the rollers against the shaft are brought close together in longitudinal series, and also the series themselves, by the staggered relation of their journal bearings, have the contiguous ends of the rollers in close relation, thus occupying very effectually all the utilizable space within the limits of the collar 10.

The flanges 6 formed on both the bed-plate 1 and cap section 2 coact to confine the collar within the limits of the seat 5 formed in the bed-plate 1, and the end-thrust of this collar is taken care of by the circular series of anti-friction balls 19 at each end of the collar confined in a race, one member 20 of which is formed in the end wall of the collar and the other member 21 of which is formed in the contiguous flange 6. In order that the balls 19 may be introduced into the race 20—21, a passage 22 is provided in the corresponding flange 6 of the cap plate 2 leading from the exterior thereof to the race, so that the balls may be readily dropped into the race until the latter is full.

It will be seen that the roller bearings form a much more extended support within any given space than would ball-bearings since with the latter the points of support between the balls and the parts carried thereby are circumscribed and at the same time necessarily more or less remote one from the other. With roller bearings, however, such as herein set forth and comprised within the scope of the present invention, much shorter bearings may be used than would be possible with ball-bearings for the same weight to be carried, while bearings of the same size as ball-bearings may support and carry a weight far in excess of what could be carried by ball-bearings occupying the same extent of surface.

By the structure of the present invention it is possible to provide anti-friction bearings for a shaft having rotative movement and at the same time reciprocatory movement. This is particularly valuable in connection with drilling machines of large capacity where the drill head is carried upon one end of the shaft and the latter is reciprocated to cause the drill-head to cut by a series of blows and at the same time the shaft is rotated about its longitudinal axis to bring the drill-head into contact with fresh surfaces. In such machines, especially those of the large type, the bearings are subjected to severe shocks and great strains, while the parts that are carried by the shaft are also of large weight. For this reason roller bearings constructed in accordance with this invention are particularly adapted for such machines and have been designed more especially for use in such machines. It may also be observed that by the use of roller bearings in these large machines injury to the shaft by scoring or otherwise is obviated and the necessity of repairs from this cause is practically eliminated.

It will be observed that the cap plate contains no rollers for the collar 10 and that, in fact, this collar is out of contact with said cap plate. In the normal operation of machines for which this invention is particularly designed, the great weight of the shaft and the parts carried thereby will keep the collar seated on the longitudinally arranged rollers in the bed-plate 1 and the cap plate simply serves to confine the collar against leaving its seat on the rollers should there, under extraordinary conditions, be a tendency to raise the collar from its seat. The chief function of the cap is to carry other parts which in themselves have nothing to do with the particular journal bearings constituting the subject of the present invention. For these reasons, it is unnecessary to provide the cap plate with roller bearings for the collar.

I claim:—

1. An anti-friction roller bearing comprising a rotatable collar, journaled rollers supporting the same and arranged parallel to the axis of rotation of said collar, and longitudinally-disposed series of rollers constituting the inner bearing face of the collar with the axis of rotation of each roller disposed parallel to the plane of rotation of the collar.

2. An anti-friction roller bearing comprising a rotatable collar, journaled rollers supporting the same and arranged parallel to the axis of rotation of said collar, and longitudinally-disposed series of rollers constituting the inner bearing face of the collar with the axis of rotation of each roller disposed parallel to the plane of rotation of the collar, the rollers of one series within the collar being staggered with relation to the rollers of the next adjacent series thereto.

3. An anti-friction roller bearing comprising a rotatable collar, journaled rollers supporting the same and arranged parallel to the axis of rotation of said collar, longitudinally-disposed series of rollers constituting a polygonal inner bearing face for the collar, and a shaft polygonal in cross section extending through the collar and supported by said rollers.

4. An anti-friction roller bearing comprising a rotatable collar, journaled rollers supporting the same and arranged parallel to the axis of rotation of said collar, longitudinally-disposed series of rollers constituting a polygonal inner bearing face for the collar, and a shaft polygonal in cross section extending through the collar and supported by said rollers, the rollers of one series within the collar being staggered in relation to the rollers of the next adjacent series thereto.

5. An anti-friction roller bearing comprising a collar having a polygonal inner face, longitudinal ribs formed along the meeting edges of the facets on the interior of the collar, journal bearings in staggered relation on opposite sides of the ribs, rollers having journals seated in said journal bearings, and other rollers exterior to said collar and supporting the same and arranged longitudinally parallel with the axis of said collar.

6. An anti-friction journal bearing comprising a supporting member carrying a semi-circular series of longitudinally-extending rollers, a rotatable collar seated on said rollers, longitudinal series of rollers carried by the interior of the collar and arranged to form a polygonal bearing surface therein, a polygonal shaft engaging the polygonally-disposed rollers within the collar, and a cap plate confining the collar to the bed-plate of the journal support.

7. An anti-friction journal bearing comprising a supporting member carrying a semi-circular series of longitudinally-extending rollers, a rotatable collar seated on said rollers, longitudinal series of rollers carried by the interior of the collar and arranged to form a polygonal bearing surface therein, a polygonal shaft engaging the polygonally-disposed rollers within the collar, a cap plate confining the collar to the bed-plate of the journal support, and anti-friction ball-bearings interposed between the ends of the collar and the journal support adjacent to the collar.

8. An anti-friction journal bearing comprising a two-part journal support, longitudinally arranged rollers in the lower section of said support and arranged in semi-circular series, a cylindrical collar split longitudinally into two equal parts with dovetailed tenons formed on one part and corresponding dovetailed mortises on the other part, securing means for fastening the two parts together, equidistant radially-disposed inwardly-projecting longitudinal ribs formed on the inner face of the collar, longitudinal series of rollers having their axes of rotation parallel with the plane of rotation of the collar, with the rollers of one series in staggered relation to the rollers of the next adjacent series, the said rollers forming a polygonal bearing face on the interior of the collar, and a polygonal shaft engaging said rollers.

In testimony that I claim the foregoing as my own, I have hereto affixed my signature in the presence of two witnesses.

JOHN PRUE KARNS.

Witnesses:
S. F. DE WOLF,
CHARLES B. WARD.